D. MARINSKY.
COLLAR SUPPORTER AND RETAINER.
APPLICATION FILED JULY 16, 1909.
950,073.
Patented Feb. 22, 1910.
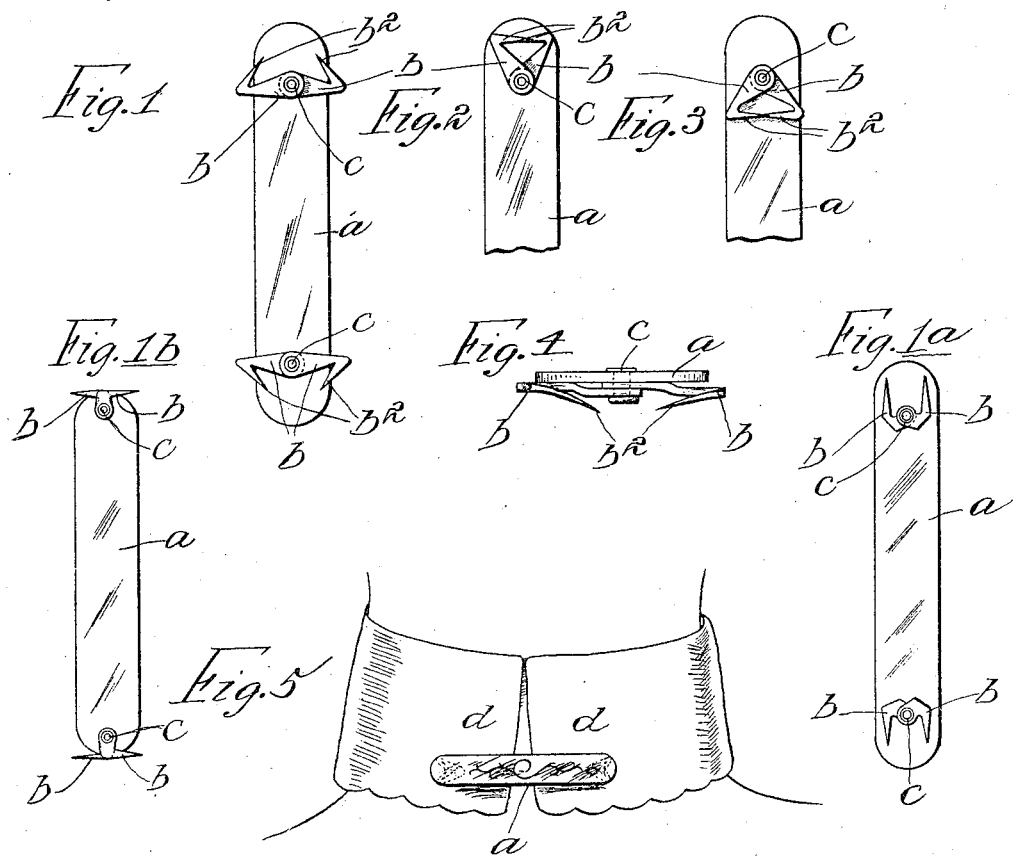
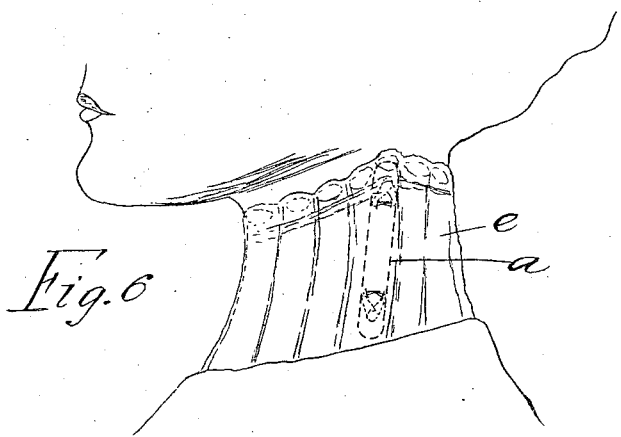
WITNESSES:
N. P. Canfield
C. E. Mulreany
INVENTOR
Davis Marinsky
BY Edgar Tate & Co.
ATTORNEYS.

UNITED STATES PATENT OFFICE.

DAVIS MARINSKY, OF NEW YORK, N. Y.

COLLAR SUPPORTER AND RETAINER.

950,073. Specification of Letters Patent. Patented Feb. 22, 1910.

Application filed July 16, 1909. Serial No. 507,912.

*To all whom it may concern:*

Be it known that I, DAVIS MARINSKY, a citizen of the United States, and residing at New York, in the county of New York and State of New York, have invented certain new and useful Improvements in Collar Supporters and Retainers, of which the following is a specification, such as will enable those skilled in the art to which it appertains to make and use the same.

This invention relates to what are known as collar supports and retainers; and the object thereof is to provide an improved device of this class which may be used by ladies either for supporting a soft and flexible collar in an upright position, or for retaining or securing the ends of a turndown collar of the same or similar material.

The invention is fully disclosed in the following specification, of which the accompanying drawing forms a part, in which the separate parts of my improvement are designated by suitable reference characters in each of the views, and in which;—

Figure 1 is a front view of my improved collar support and retainer, Figs. 1$^a$ and 1$^b$ views similar to Fig. 1, but showing slight modifications, Fig. 2 a similar view of one end portion of the device and showing the parts in a different position, Fig. 3 a view similar to Fig. 2 but showing the parts in another position, Fig. 4 an end view of the device as shown in Fig. 1, Fig. 5 a view showing the use of the device as a retainer for the ends of a turndown collar, and;— Fig. 6 a view showing the device used for the purpose of holding a flexible collar in an upright position.

In the practice of my invention, I provide an oblong strip $a$ preferably of flexible material such as celluloid or rubber, or which may be made of metal if desired, and pivoted to one side thereof and at a predetermined distance from the ends thereof are hook devices $b$. The hook devices $b$ consist of shank members through the ends of which are passed pivot eyelets or similar devices $c$ which are also passed through the strip $a$, and the outer ends of the hook devices $b$ are provided with hooks, barbs or prongs $b^2$ which are curved outwardly as clearly shown in Fig. 4 and which are adapted to be turned into different positions as shown in Figs. 2 and 3.

In Fig. 5 of the accompanying drawing, I have shown at $d$ the end portions of a turndown collar, and in using my improved collar support or retainer for the purpose of holding or retaining the end portions of the collar as shown in Fig. 5, the device is pressed on the collar in the position shown in said figure and the hook devices $b$ are turned either into the position shown in Fig. 2, or into the position shown in Fig. 3, and in this operation the barbs or prongs $b^2$ pass into the material of the end or turndown portions of the collar and the points thereof overlap and the device is securely retained in place and holds the turndown end portions of the collar in proper position as clearly shown in said figure.

The pivotal connection at $c$ of the hook devices $b$ is made tight so as to hold the said hook devices by friction in any position into which they may be turned, and in Fig. 6 I have shown my improvement employed for the purpose of holding a flexible collar $e$ in an upright position and preventing it from sagging downwardly, and when the device is used for this purpose it is attached to the inner side of the collar in the position indicated in dotted lines in said figure, and the hook devices $b$ are turned either into the position shown in Fig. 2, or into the position shown in Fig. 3, but in this use of said device the hook devices $b$ are preferably turned into the position shown in Fig. 2.

My invention is not limited to the method of using the hook devices $b$ in the position shown in Figs. 2 and 3, and said hook devices may be turned into other positions, but the method of using the said hook devices as herein shown and described will be sufficient to illustrate the invention both in its construction and operation. It is also apparent that my invention may be used for the purposes other than those shown in Figs. 5 and 6, as for instance in catching up or holding up a garment, and for the purpose of attaching one article to another and for similar purposes.

In Figs. 1$^a$ and 1$^b$ of the accompanying drawing I have shown slight modifications in the shape of the hook devices $b$, and it will be understood that the points $b^2$ of the hook devices $b$ as shown in Figs. 1$^a$ and 1$^b$ are curved outwardly the same as in Fig. 4.

With all the forms of construction shown it will be seen that the hook devices consist of shank members through which the pivotal devices are passed, and hook portions arranged either at an acute or right angle to said shank portions and when my improvement is used with the parts in the position shown in Figs. 1 to 4 inclusive, the hook members overlap when in use and securely hold the articles to which they are attached, or the device itself in connection with said article, and the hook devices shown in Figs. 1ª and 1ᵇ may be similarly used.

Having fully described my invention, what I claim as new and desire to secure by Letters Patent, is:—

A device of the class described comprising an oblong strip of material provided on one side thereof, and on the opposite end portions thereof with two hook devices pivoted thereto inwardly of the ends of said strip and which comprise shank portions and hook members arranged at an angle to said shank portions, said hook devices being adapted to be turned into different positions and the points thereof to overlap.

In testimony that I claim the foregoing as my invention I have signed my name in presence of the subscribing witnesses this 13th day of July 1909.

DAVIS MARINSKY.

Witnesses:
H. R. CANFIELD,
C. E. MULREANY.